INVENTOR.
GENE T. TUTTLE
BY A H Oldham
ATTORNEY

INVENTOR.
GENE T. TUTTLE
BY S H Oldham
ATTORNEY

INVENTOR.
GENE T. TUTTLE
BY A H Oldham
ATTORNEY 3,300,761
ASSOCIATIVE MEMORY APPARATUS USING ELASTIC SWITCHING STORAGE ELEMENTS
Gene T. Tuttle, Akron, Ohio, assignor to Goodyear Aerospace Corporation, a corporation of Delaware
Filed May 15, 1963, Ser. No. 280,602
4 Claims. (Cl. 340—172.5)

This invention relates to an associative memory means using elastic switching techniques in magnetic storage elements, and more particularly to an associative memory system utilizing toroidal ferrite magnetic cores characterized by a non-destruct readout feature.

Heretofore it has been known that there have been various attempts to effect an associative memory system in a digital memory storage apparatus. However, these attempts have only been successful with the utilization of very large, bulky and extremely expensive equipment, and which operate only by utilizing comparatively large amounts of power.

It is the general object of the invention to avoid and overcome the foregoing and other difficulties of and objections to prior art practices by the provisions of an associative memory system adapted for a digital memory storage apparatus which utilizes the elastic switching properties of standard ferrite toroidal magnetic cores to effect a non-destructive associate memory system which is inexpensive, smaller than conventional associative memory systems, and which utilizes less power than conventional associative memory systems.

Another object of the invention is to provide a digital memory storage system adapted for associative memory which utilizes a plurality of ferrite toroidal magnetic cores having flux patterns set therein, where a strobe current is passed through the cores for a very short period of time to thereby determine the flux patterns in the cores, but not to switch the flux patterns in the cores because of the short duration of the pulse, so that the flux patterns in the cores may only tend to reverse, but return to their original state by the elastic property of the flux patterns therein.

Another object of the invention is to utilize the elastic properties of a flux pattern in a ferrite core to determine the flux pattern in a magnetic core without changing the flux pattern therein.

Another object of the invention is to utilize the properties of a flux pattern in a magnetic core known as the hysteresis effect by biasing the flux in its set direction to take it slightly upward from its stable point, applying a very short but high intensity strobe pulse tending to reverse the flux direction, but stopping the strobe pulse before actual flux reversal so that the flux pattern will return to its original stable position by the elastic properties of the flux pattern, and measuring the amount of flux change during the strobe pulse to determine the flux pattern set in the core.

Another object of the invention is to provide an associative memory system adapted for a digital memory storage apparatus which will cost less to build than the conventional associative memory system, which will operate on less power than the conventional associative system, which will be smaller than the conventional associative system, and which will still incorporate a non-destructive core readout.

The aforesaid objects of the invention, and other objects which will become apparent as the description proceeds, are achieved by providing in a digital memory storage system adapted for associative memory the combination of a memory unit, a plurality of toroidal ferrite magnetic cores comprising the memory unit, the cores being arranged in columns with corresponding cores in each column being physically in aligned rows, a wire threading each core, a single bias line passing through each core of each aligned column of cores, a single strobe line passing through each core of each aligned column of cores, a common sensing means for each row of cores, means to place a word into memory as bits of information stored as a set flux pattern in each individual core in each row of aligned cores in the memory unit, means to place a compare word into memory so that each bit of information of the compare word is aligned with the columns of corresponding bits of the words stored in the memory unit, means to simultaneously pulse each bias line with a signal of less magnitude than sufficient to switch the flux direction in the cores, the bias pulses tending to effect a flux direction in each core of each column of aligned cores opposite to the information stored in each aligned compare word bit, said bias pulses having a period slightly greater than the strobe pulses, but of less magnitude than required to set a flux pattern into a core in memory, means to pulse each strobe line with a signal of greater magnitude than sufficient to switch the flux direction in the cores, said strobe pulses tending to effect a flux direction in each core of each column of aligned cores the same as the information stored in each aligned bit of the compare word, the strobe pulses having a period of less than the time required to effect a permanent flux reversal in each core, with each core snapping back to its original flux pattern due to the elastic properties of the hysteresis effect of flux patterns in ferrite cores, means to measure each sensing means during the strobe pulse to determine flux changes in the core during the strobe pulse, and means to correlate information received from the sensing means to determine the address of all words stored in the memory unit which correspond to the compare word.

For a better understanding of the invention reference should be had to the accompanying drawings, wherein.

The invention anticipates the non-destructive readout characteristic of a single magnetic storage device such as a toroidal core utilizing elastic switching techniques. The advantages of using a plurality of toroidal cores in a digital memory stowage system are the low power required and the resultant high-speed of operation inherent in elastic switching circuits. Also, it is possible to construct an associative memory function into the device.

The associative memory function in a digital memory storage system is that function where a compare word is compared to every word stored in memory, with the comparison taking place during one normal read cycle. A normal read cycle has a time duration of about 2 to 4 microseconds depending on the type of ferrite material used in the memory cores. As an example, the associative memory function might be used in a military application to determine types of unkown electronic signals. To achieve this use, the first thing would be to break down the characteristics of all electronic signals known to man. Each signal's characteristics would probably include frequency, pulse width, amplitude, intensity, pulse repetition rate, waveform, and whatever other characteristics are distinguishing. The characteristics for each signal would be arranged in corresponding sequence and then, if the memory unit word length was sufficient, the arranged characteristics for each signal would be written in uniform sequence as one word into the memory unit. Thus, upon completion of the write task the memory unit would contain all electronic signals known to man written into the memory unit as words comprising certain characteristics. Suppose then this memory unit with the information stored therein were mounted on board a war ship, and the passive electronic signal detection equipment of the ship picked up an unknown electronic signal. The unknown signal could be broken down into its characteristics and arranged in the same sequence as all the signals stored in the memory unit. The sequential characteristics of the unknown signal would then be used as the compare word, and it could immediately be determined if any of the signals written as words into memory corresponded to the unknown signal represented by the compare word. Once the unknown signal has been matched with a known signal in the memory unit it can be determined from the list of known signals what probable type of transmitting equipment is being used for the unknown signal. With the vast number of transmitting means for electronic signals used in military applications today, a means to quickly detect as enemy or friendly the probable type of transmitting equipment for an unknown electronic signal becomes an important strategic device.

Figure 1:
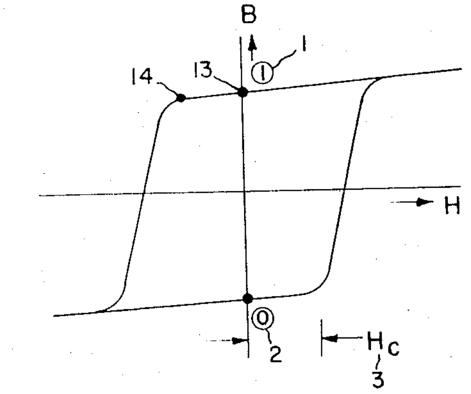
FIGURE 1 is a standard hysteresis curve showing positive and negative flux values representing a ONE and a ZERO respectively, stored in a ferrite core of a memory device.
Figure 8:
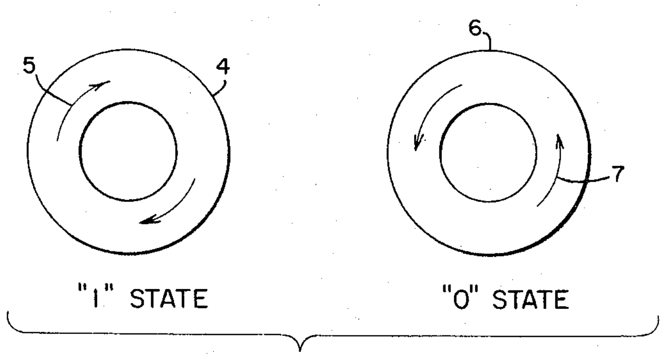
FIGURE 8 is an enlarged schematic diagram of cores used in the apparatus of the invention showing flux directions representing ONE and ZERO states.

The properties of a ferric toroidal magnetic core with regard to magnetic switching of a flux pattern set therein is best shown in a B/H curve. A typical B/H curve is shown in FIGURE 1, wherein B represents the magnetic induction or flux density of the material, and H represents the magnetizing force applied. By definition, and as customary in the art, we will state that when a positive pulse is used to fully switch a core it will be in the ONE state, indicated in FIGURE 1 by numeral 1, and when a negative pulse fully switches the core it will be in the ZERO state, indicated by numeral 2. With reference to FIGURE 8, it can be seen that a toroidal core 4 containing a clockwise flux pattern, indicated by the arrows 5 represents a "ONE" state, whereas a toroidal core 6 containing a counter clockwise flux pattern indicated by the arrow 7 represents a "ZERO" state.

Initially, when using commercial cores they will be checked to determine the total full switching M.M.F. and the $H_c$ value. $H_c$, indicated by the numeral 3, by definition, is the M.M.F. required to just cause switching in the magnetic circuit and which is commonly referred to as the coercive force of the material.

In the conventional mode of memory operation, a read signal is produced by switching the flux pattern in a core to the opposite state since an output voltage is developed only when the flux is changing. However, this flux reversal leaves the wrong piece of information stored in the core, and it is therefore necessary to switch the flux back to its original state. Saying this in another manner, it is necessary to rewrite the information back into the core after it has been readout. Since the flux direction cannot change instantaneously, complete switching of the flux from one direction to the other requires a comparatively large interval, usually in the order of a few microseconds. Complete switching also necessitates the use of relatively large amounts of energy. As an example, the Electronics Memories Type 50–157 core requires 400 milliamperes to completely switch the flux in four microseconds. If the supply voltage is assumed to be 5 volts, the energy needed is 400 ma.×4μsec×5 volts which equals 8 microwatt-seconds. However, since a read cycle must be followed by a write cycle, both of which require full flux switching, twice as much time and energy must be expended to readout a stored signal and prepare the memory core to be read again. Thus, the required energy and time interval total 16 microwatt-seconds for conventional magnetic core storage techniques. Ratios of output signal to noise are typically between 4 and 5 for a device operated in this mode.

In the associative memory system to be described later the readout cycle is extremely short and does not destroy the information that is stored in the core. The nondestruct readout is possible because of the elastic switching techniques proposed hereinafter. An initial write cycle, operating in the same manner as the conventional write cycle, inserts the desired information into the core by switching the flux to the pattern directed by the signal. To readout the stored information a large amplitude, short duration strobe pulse is applied to the core attempting to switch the flux direction set into the core during the write cycle. However, as indicated in FIGURE 7, pulse duration of the strobe pulse, indicated by the numeral 8, is of a time duration much less than the time required to accomplish complete flux switching in the core, and the flux does not reverse permanently.

Figure 7:
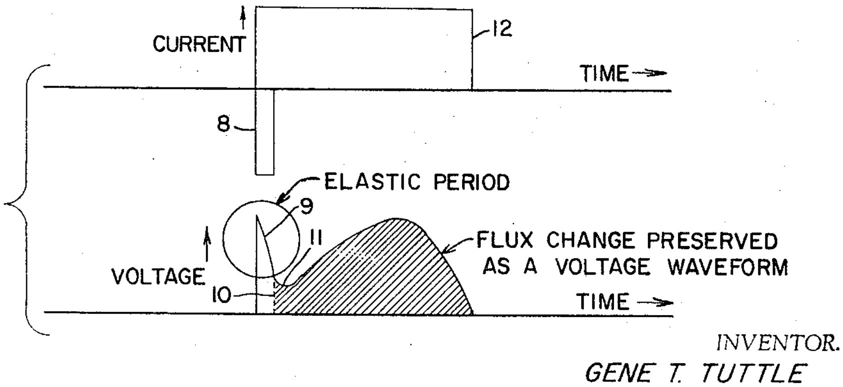
FIGURE 7 is a graphic illustration of the wave forms created during a flux changing current pulse showing the elastic effect of the flux pattern, and how the strobe pulse of the invention utilizes this elastic effect.

The bottom portion of the graphic diagram of FIGURE 7 illustrates the flux change in the core represented as a voltage wave form. The strobe pulse 8 is applied for a time duration such that the flux switching action starts down the inclined portion 9, of the graph, but is terminated, as indicated by the dotted line 10, before the flux reversal enters into the valley portion 11 of the graph. Thus, when the strobe pulse 8 is terminated, the flux pattern in the core returns to its normal or original level in an elastic manner. The elastic properties of a flux pattern set into a ferrite core have been observed and known for a long time. The block 12 shown on the top portion of the graph of FIGURE 7 represents the current amplitude and pulse time duration necessary to completely effect a flux switching in the core.

With reference to FIGURE 1, the elastic properties of the core could be represented by supposing that a positive or a "ONE" state was introduced into the core which results in a flux density indicated where the hysteresis curve crosses the positive B line, as represented by the numeral 13. If a strobe pulse, as illustrated in FIGURE 7, is applied in a negative direction the flux density in the core will start to swing to the left to reverse itself. However, because of the short duration of the strobe pulse the reversal will only have moved to an approximate point on the curve indicated by the numeral 14. Thus, when the pulses terminated the flux in the core will tend to return to its original position 13 by the elastic property previously described.

Figure 2:
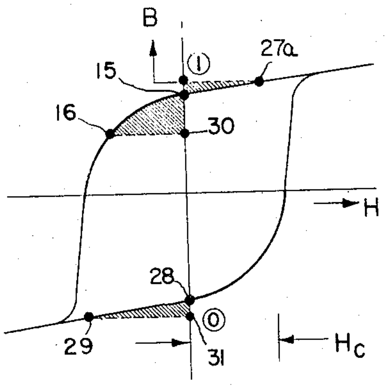
FIGURE 2 is a hysteresis curve believed more accurately to represent the true picture of what occurs during the flux changing in a ferrite core by elastic switching.

Extensive testing was conducted to determine the exact elastic properties of various materials and it was found that the hysteresis curve for most ferrite materials formed when utilizing a short duration high intensity strobe pulse looked more like the graphic illustration of FIGURE 2. In other words, the curve was more gradual, and more sloping than as shown in FIGURE 1. In FIGURE 2, with a positive flux pattern set into the core the flux density settles to a stable point, indicated by the numeral 15. The application of the strobe pulse 8 in a negative direction tends to reverse the flux pattern to an approximate point indicated by the numeral 16, with the flux pattern still returning to its original level at 15 after the strobe pulse 8 terminates. Therefore, it was found that a much greater variation in the flux density was achieved by the strobe pulse 8 in actual testing of ferrite cores, as indicated bebetween the points 15 and 16 of FIGURE 2, than was thought theoretically possible, as indicated between the points 13 and 14 of FIGURE 1. The use of this phenomenon will be described later.

In order to insure that non-destructive readout was obtained utilizing a strobe pulse, extensive testing of the elastic technique was conducted. A schematic test apparatus is illustrated by mirror notation in FIGURE 3. A set pulse, indicated by numeral 17 is applied to the core 18 in a direction indicated by the slanting line 19. A reset line 20 is passed through the core 18 in the opposite direction to the set line 17, as indicated by slant line 21. A strobe line 22, as previously explained, passes through the core 18 in a direction indicated by the slant line 23. In some instances in order to enhance elastic switching, a bias line 24 may be used, and will oppose the strobe pulse, as indicated by the slant line 25. In order to determine the exact amount of flux change, if any, which takes place in the core 18 during the strobe pulse, an output line 26 passes through the core in a manner indicated by slant line 27. The test procedure was as follows:

(A) A "ONE" state stored in the magnetic core 18 by the set pulse is capable of detection by applying a strobe pulse to the core 18 in the ZERO or minus direction, as a minus output signal is observed on the output winding 26. In order to aid and enhance elastic switching, as mentioned previously, some positive bias signal may be used. This bias must be less than $H_c$. The effect of the bias signal is illustrated in FIGURE 2, as this signal applied in the positive direction tends to push the flux up to a point, indicated by the numeral **27*a*, to thereby allow a strobe pulse of greater magnitude or longer duration to move the flux density to point 16 thereby effecting a greater change in the flux density of the core by the strobe pulse making it easier to measure the flux change. If bias is not used, the flux change on the curve will be represented by the line from 15 to 16** in FIGURE 2.

(B) If a ZERO is stored in the magnetic circuit a minus output signal on the sense wire will again be observed when the strobe pulse is applied, but the output signal will be less than that observed for a stored "ONE" state since the magnetic circuit is now saturated in the ZERO or negative state. With reference to FIGURE 2 it will be seen that the strobe pulse again applied in the negative direction but with no positive bias will tend to move the flux pattern, originally stabilized at a position indicated by numeral 28, downward and to the left on the hysteresis curve to an approximate point indicated by numeral 29. It can readily be seen that the flux density change for this application is considerably less than that observed with the core in a "ONE" state when measured with a negative strobe pulse.

(C) The reverse of the above operations (A) and (B) is also true. Therefore, if a ZERO state is stored in the magnetic circuit, the greater flux density change would be detected by applying a positive strobe pulse, whereas a lesser flux density change would be detected if the core were in a "ONE" state and were strobed positively. Note that again the flux density change might be increased using a bias signal.

(D) Since the primary purpose of the cores being tested is to perform an associative memory, it is necessary to obtain the "exclusive OR" or the "identity" functions. These functions are realized if we consider the strobe pulse as the second input variable, and the stored information in the magnetic circuit as the first variable. Therefore, in accordance with the test results indicated in sub paragraphs A through C heretofore, a large output signal, whether positive or negative, is obtained only if the strobe pulse is opposite to the flux density stored in the core, whereas a smaller output signal is obtained if the strobe pulse is the same as the flux density stored in the core. Thus, the "exclusive OR" and "identity" functions are achieved. The "exclusive OR" function is $A\cdot\overline{B}+\overline{A}\cdot B$ and the "identity" function is $A\cdot B+\overline{A}\cdot\overline{B}$.

Usually, in circuits of this type, a signal to noise ratio is recognized as the ratio between the flux density change achieved by a strobe pulse when applied opposite to the core state and the flux density change achieved by a strobe pulse applied to enhance the core state. With reference to FIGURE 2, this ratio could be represented on the hysteresis curve as the shaded area enclosed by the stable point of flux density 15 on the hysteresis curve and the horizontally projected change of the approximate point 16, as indicated by numeral 30, and the shaded area from point 28 to the horizontally projected approximate point 29 achieved by the negative pulse, as indicated by the numeral 31. Therefore, in linear representation the signal to noise ratio for a "ONE" state in a core, and a negative strobe pulse applied is represented by line 15–30 divided by line 28–31. It has been found that the use of conventional toroidal cores provides a signal to noise ratio of 2 to 4. A signal to noise ratio in this range provides sufficient output signals when utilizing the strobe pulse and the elastic properties of the flux pattern, to make this arrangement perfectly feasible for use in a digital memory storage system, and is particularly adapted for use in associative memory. As mentioned previously, a bias pulse may be utilized for certain materials under certain circumstances to increase the signal to noise ratio.

Figure 4:
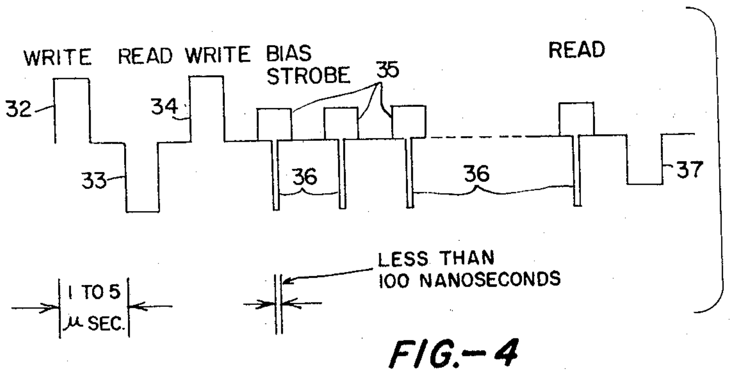
FIGURE 4 is a diagrammatic illustration of the wave forms represented by the operation of the mirror notation diagram of FIGURE 3.

A considerable series of testing was conducted to determine if the write-read properties of a toroidal core would be affected by using the bias pulse-strobe pulse principles disclosed above. A graphic illustration of this testing is represented in FIGURE 4 wherein a write cycle, indicated by the numeral 32 is represented, and which cycle takes from 1 to 5 microseconds depending on the ferrite type material used in the toroidal core. After the original cycle is completed, a read cycle, indicated by numeral 33, of the same duration as the write cycle, is effected with the output signal of the read cycle being accurately measured. The read cycle 33 is followed by a write cycle 34 which is exactly the same as the write cycle 32. The second write cycle 34 is followed by a plurality of bias pulses 35, with a strobe pulse 36 being effected sometime during the period of the bias pulse. As indicated in FIGURE 4, the strobe pulses 36 have a duration of less than 100 nanoseconds, which duration is determined by the elastic properties of the core being used. Note also, that the magnitude of the strobe pulses 36 is greater than the magnitude of the read or write pulses. Note that the magnitude of the bias pulses 35 is less than the magnitude of the read and write pulses, and in fact the bias pulse magnitude must be less than the value of $H_c$ as mentioned previously. After a plurality of bias-strobe pulses had been placed on the core, which plurality in the test was conducted between parameters of 64,000 and 1,064,000 times, a second read cycle indicated by numeral 37, was effected, measured, and compared with the first read cycle 33. It was found that the amplitude of the second read cycle 37 was exactly the same as the first read cycle 33 regardless of the number of bias-strobe pulses placed on the core. Further, it was found that the amplitude of the second read cycle 37 was exactly the same as the first read cycle 33 even if no bias pulse was used, thus proving the non-destructive readout capability.

Figure 3:
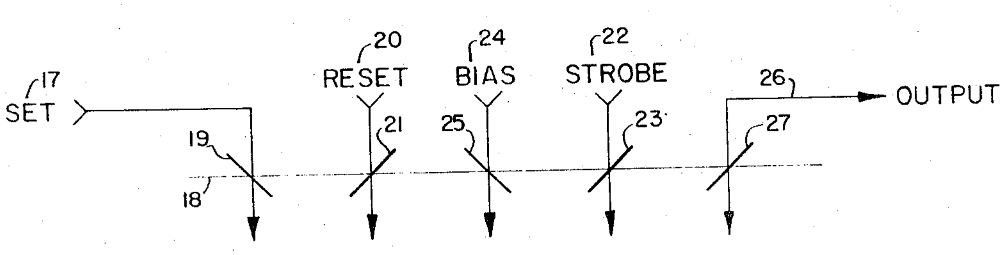
FIGURE 3 is a mirror notation diagram of a magnetic core capable of performing an exclusive OR function in a non-destructive manner.
Figure 5:
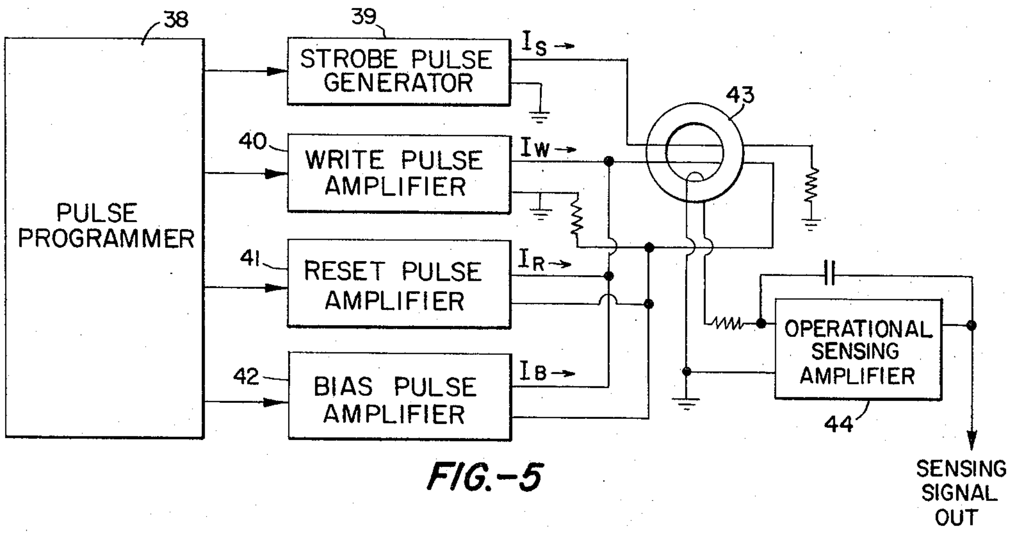
FIGURE 5 is a block diagram of the apparatus used to effect the exclusive OR function in the associative memory system with the non-destructive readout feature of the invention.

The physical means to achieve the testing indicated by the mirror notations schematic of FIGURE 3, and the graphic resulting effects of FIGURE 4, is illustrated in the block diagram of FIGURE 5. A pulse programmer 38 coordinates the timing of the pulses through the strobe pulse generator 39, the write pulse amplifier 40, a reset pulse amplifier 41, and a bias pulse amplifier 42. The stroke pulse generator and amplifier outputs indicated by $I_s$, $I_w$, $I_r$, and $I_b$ respectively are directed according to their sequential pulse programming through a toroidal core 43. An operational sensing amplifier 44 is provided with associative wiring passing through the core 43 to accomplish the sensing necessary to effect an output signal utilized to determine the flux pattern in the core 43, all as previously described.

Figure 6:
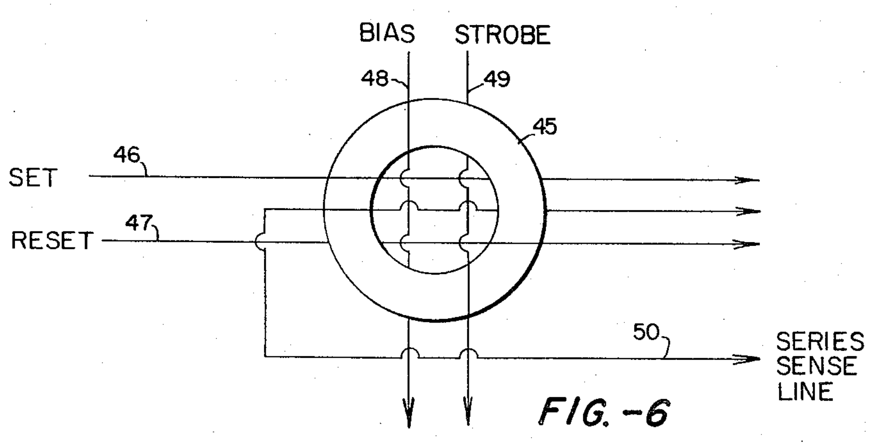
FIGURE 6 is an enlarged schematic diagram of the toroidal core shown with the wiring utilized to achieve the objects of the invention.

FIGURE 6 illustrates a standard toroidal core 45 used for a memory system having a set line 46 being wound thereon in one direction, and a reset line 47 being wound thereon in an opposite direction. A bias line 48 is provided which is wound in the same direction as the set line 46, whereas a strobe line 49 is wound on the core 45 in an opposite manner to the bias line 48. A bit sense line 50 is provided to determine the flux change in the core 45 when the strobe pulse is passed through the strobe line 49, all as previously explained. Therefore, as proved by the testing, in the elastic switching mode, an output signal is produced, even though the flux in the core 45 has returned to its initial state, since there has been a rate of change of flux with time.

It has been observed that the critical force value of the strobe pulse is an inverse function of the duration of the applied force for small pulse widths. Therefore, as smaller strobe pulse widths are used, the amplitude of the driving force may be increased before any permanent switching occurs in the core, and larger output signals may be obtained still utilizing the elastic techniques. Utilizing this technique of reduced pulse duration and increased pulse amplitude, output signal to noise ratios, as explained previously, have been obtained that are comparable to those presented by conventional read techniques, but with the additional advantages of considerably smaller time and power requirement conditions. For example, using the same core cited earlier, the Electronics Memory Type 50–157, an output signal to noise ratio of 3.30 has been achieved with a drive pulse amplitude and duration of 650 milliamperes and 0.05 microsecond respectively, without a bias pulse. Again, as in the previous example of conventional digital memory stowage, assuming that the supply voltage is 5 volts, the energy required to operate in this elastic switching mode is 650 milliamperes times 0.05 microsecond times 5 volts or 0.16 microwatt-second. Since it is not necessary to rewrite the information back into the core after a read cycle, as the cores are non-destructive utilizing the elastic mode, this value of 0.16 microwatt-second is the total amount of energy required to perform a single interrogation. Recalling that the energy which is necessary to perform a conventional interrogation is 16 microwatt-seconds, it can be seen that the elastic switching technique reduces the energy requirement by a factor of 100 to 1 in this particular core. Also, the read time under elastic switching techniques is only 0.05 microsecond, which is less than the read time utilizing the conventional techniques by a factor of 8.0 microseconds divided by .05 microsecond or 160 times. Another definite advantage of the elastic switching techniques disclosed herein is that the technique does not depend upon the use of any new or special device for successful operation. In fact, inexpensive, slow-switching speed cores seem to present the most favorable results. Also, elastic switching for readout may be used in multi-apertured ferrite cores and thin film ferrite storage elements as desired.

In order to utilize the elastic techniques described heretofore in an associative memory system it is necessary to bit orientate all the cores in memory in columns, and have single strobe and bias lines threading through each bit orientated column in memory. Thus, with reference to FIGURE 9, the associative function of comparing a word stored in the load and compare register 51 to all of the words stored in the memory unit 52 is accomplished as follows:

(A) First, the words are written into memory in the cores of the memory unit 52 in standard fashion. The contents of the compare register 51 determines, bit by bit, which +S or −S strobe driver in strobe driver section 53 is gated on.

(B) The strobe pulses are rippled sequentially through each bit orientated column with the series sense line 50, as seen in FIGURE 6, on each core sensing the output pulse signal. For every ZERO in the compare register 51, the −S driver is gated on and for every ONE the +S driver is gated on. Thus, for each bit location, either a +S or −S strobe driver is turned on. It should be noted that the gating on of the strobe drivers is a memory orientated function where the entire memory unit 52 is operated upon.

(C) The series sense lines 50, as seen in FIGURE 6, of all cores making up one memory word are wired together in series thus providing the means of reading all the cores comprising one memory word during the compare operation.

(D) Resolving which words in the memory unit 52 correspond to the compare word is accomplished by feeding the series sense lines from the memory unit 28 through two parallel standard toroidal core planes in the compare core planes section 54. The cores of the compare core plane section 54 are arranged and related to the series sense lines so as to divide the word locations in memory into columns and rows indicating the specific words in memory. The cores in the plane section 54 are set by the current pulses from the series sense lines, which pulses must usually be amplified. The cores in the plane section 54 are interrogated by reading all the columns simultaneously first, and then sequentially reading rows in each column that indicates a signal. The signals from each column and row are then broken down in X and Y coordinates with the column signal sent to the X coordinate section 55 and the row signal sent to the Y coordinate section 56 to describe the address of any and all words in the memory unit 52 corresponding to the compare word. The structure and interrogation of the planes in the planes section 54 are the subject of a patent application entitled "Resolving Multiple Responses in An Associative Memory" which will be filed subsequently. It is to be understood that standard solid state devices could be used in place of the planes section 54 to locate the address of all words in the memory unit 52 corresponding to the compare word. However, the desirable feature of the planes in the planes section 54 is that the number of solid state devices necessary for operation is reduced to two times the square root of the number of devices necessary in the conventional system.

(E) The word address outputs from the X coordinate section 55 and the Y coordinate section 56 provide an input to the word address register 57 to select the proper word in the memory unit 52 by means of the word selection cores section 58.

Figure 9:
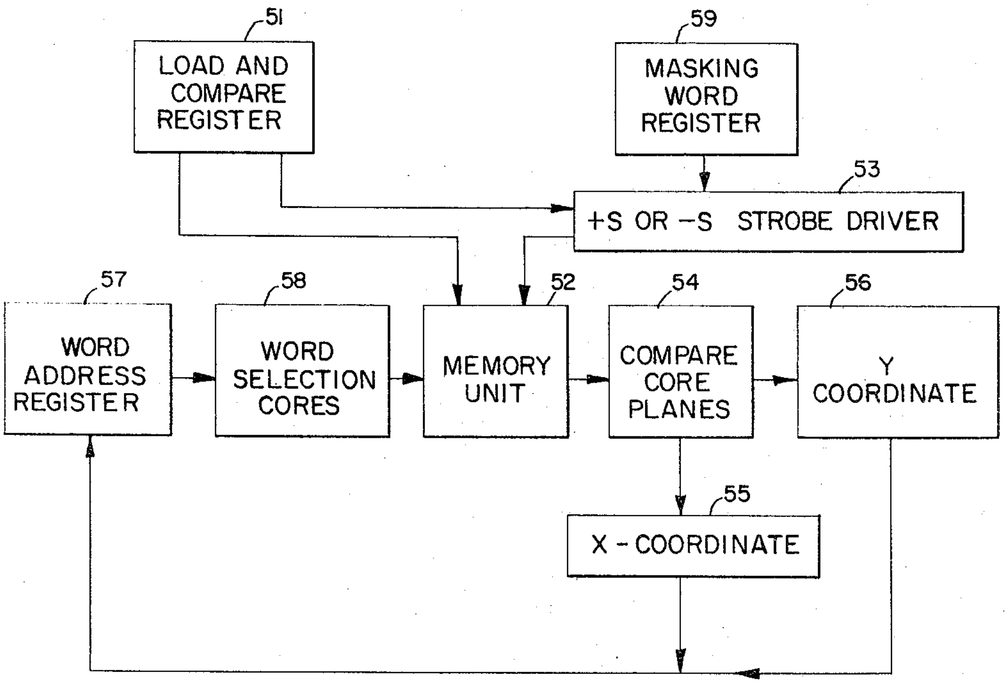
FIGURE 9 is an associative memory block diagram showing how the principles of elastic switching are combined in an associative memory system.

The block portions of the diagram of FIGURE 9 not explained in detail are conventional equipment used on all digital memory storage systems in use today. Also, a plurality of conventional solid state devices might be utilized in place of the cores in the compare core planes section 54, to indicate the address of a word or words corresponding to the compare word.

A masking function provides the capability of selecting any part of the memory words on which to compare. A mass control word is stored in the masking word register 59. The function of this control word is to indicate the bits to be masked out of the compare operation. A bit is masked out of the compare operations simply by inhibiting either the +S or −S strobe driver of the bit in the strobe driver section 53 so that this bit does not enter into the compare operation.

Therefore, it is seen that the objects of the invention are achieved by utilizing an elastic switching technique in conjunction with a bit orientated compare word by sequentially pulsing the bit orientated columns with strobe pulses in accordance with the information contained in the bit orientated compare word. Thus, every aligned bit in memory is interrogated and sensed for comparison with the compare word. The sensing signal from each word can then be led to solid state devices or other appropriate means to determine the address of any and all words in memory which correspond to the compare word.

While in accordance with the patent statutes one best known embodiment of the invention has been illustrated and described in detail, it is to be particularly understood that the invention is not limited thereto or thereby, but that the inventive scope is defined in the appended claims.

What is claimed is:

1. In a digital memory storage system adapted for associative memory the combination of a memory unit, a plurality of toroidal ferrite magnetic cores comprising the memory unit, the cores being arranged in columns with corresponding cores in each column being physically in aligned rows, a coil wrapped on each core, a single bias line passing through each core of each aligned column of cores, a single strobe line passing through each core of each aligned column of cores, a sensing means on each core, means to place a word into memory as bits of information stored as a set flux pattern in each individual core in each row of aligned cores in the memory unit, means to place a compare word into memory so that each bit of information of the compare word is aligned with the columns of corresponding bits of the words stored in the memory unit, means to sequentially pulse each bias line with a signal of less magnitude than sufficient to switch the flux direction in the cores, means to apply said signal in such a direction so as to oppose the flux direction in each aligned compare word bit, means to sequentially, but simultaneously in time with each bias pulse, pulse each strobe line with a signal of greater magnitude than sufficient to switch the flux direction in the cores, but with a period of less than the time required to effect a permanent flux reversal, means to apply said signal in such a direction so as to correspond to the flux direction in each aligned compare word bit, means to measure each sensing means during the strobe pulse to determine flux changes in the core during the strobe pulse, and means to correlate information received from the sensing means to determine the address of all words stored in the memory unit which correspond to the compare word.

2. In a digital memory storage system adapted for associative memory the combination of a memory unit, a plurality of ferrite magnetic cores comprising the memory unit, the cores being arranged in columns with corresponding cores in each column being physically in aligned rows, a coil wrapped on each core, a single strobe line passing through each core of each aligned column of cores, a sensing means on each core, means to place a word into memory as bits of information stored as a set flux pattern in each individual core in each row of aligned cores in the memory unit, means to place a compare word into memory so that each bit of information of the compare word is aligned with the columns of corresponding bits of the words stored in the memory unit, means to sequentially pulse each strobe line with a signal of greater magnitude than sufficient to switch the flux direction in the cores, but with a period of less than the time required to effect a permanent flux reversal, means to apply said signal in such a direction so as to correspond to the flux direction in each aligned compare word bit, means to measure each sensing means during the strobe pulse to determine flux changes in the core during the strobe pulse, and means to correlate information received from the sensing means to determine the address of all words stored in the memory unit which correspond to the compare word.

3. In a bit orientated digital memory storage system divided into columns and rows utilizing toroidal ferrite cores the combination of a means to place a word into memory in each row, means to place a compare word into the systems so that the bits comprising the compare word are oriented with the columns of bit orientated words in memory, means to sequentially bias each bit oriented column with a pulse in accordance to the corresponding oriented bit of the compare word, means to sequentially strobe each bit oriented column with a current pulse determined in accordance to the corresponding oriented bit of the compare word, the strobe pulse means occurring after the start of, but during the bias pulse means, means to simultaneously sense which cores in each bit oriented column correspond to the corresponding oriented bit of the compare word, and means to determine the address of all words stored in memory which correspond to the compare word.

4. In a bit orientated digital memory storage system divided into columns and rows utilizing ferrite cores the combination of a means to place a word into memory in each row, means to place a compare word into the systems so that the bits comprising the compare word are oriented with the columns of bit orientated words in memory, means to sequentially strobe each bit oriented column with a current pulse determined in accordance to the corresponding oriented bit of the compare word, means to sense during the strobe pulse means which cores in each bit oriented column correspond to the corresponding oriented bit of the compare word, and means to determine the address of all words stored in memory which correspond to the compare word.

References Cited by the Examiner

UNITED STATES PATENTS

| | | | |
|---|---|---|---|
| 3,031,650 | 4/1962 | Koerner | 340—174 |
| 3,196,413 | 7/1965 | Teig | 340—174 |

ROBERT C. BAILEY, *Primary Examiner.*

R. B. ZACHE, *Assistant Examiner.*